(12) United States Patent
Munz

(10) Patent No.: US 6,217,922 B1
(45) Date of Patent: Apr. 17, 2001

(54) BOILER EXTRUSION PROCESS AND PLANT FOR PRODUCTS, PREFERABLY FOR HUMAN OR ANIMAL CONSUMPTION

(75) Inventor: Konrad Munz, Neukirch an der Thur (CH)

(73) Assignee: Buhler AG, Uzwil (CH)

(*) Notice: Subject to any disclaimer, the term of this patent is extended or adjusted under 35 U.S.C. 154(b) by 0 days.

(21) Appl. No.: 09/051,743
(22) PCT Filed: Sep. 26, 1996
(86) PCT No.: PCT/CH96/00336
§ 371 Date: Jul. 9, 1998
§ 102(e) Date: Jul. 9, 1998
(87) PCT Pub. No.: WO97/14312
PCT Pub. Date: Apr. 24, 1997

(30) Foreign Application Priority Data

Oct. 19, 1995 (CH) .................................................. 2961/95

(51) Int. Cl.[7] .................................. A23L 1/00; A23P 1/00
(52) U.S. Cl. .......................... 426/231; 425/143; 425/146; 425/203; 426/511; 426/516
(58) Field of Search .................................. 426/510, 511, 426/516, 448, 231; 99/468; 425/203, 204, 143, 146

(56) References Cited

U.S. PATENT DOCUMENTS 5,120,559 * 6/1992 Rizvi et al. ........................ 426/510
5,652,009 * 7/1997 Mair .................................. 426/510

FOREIGN PATENT DOCUMENTS 3818422   12/1989   (DE) .

* cited by examiner

Primary Examiner—George C. Yeung
(74) Attorney, Agent, or Firm—Burns, Doane, Swecker & Mathis, L.L.P.

(57) ABSTRACT

The present invention is directed to feeding steam, which is let out of a stream outlet, into the conditioning stage of an installation for boiling extrusion of products. In the installation according to the invention, a connecting line is provided from the aforementioned steam outlet to a predetermined point on the conditioning stage.

12 Claims, 1 Drawing Sheet

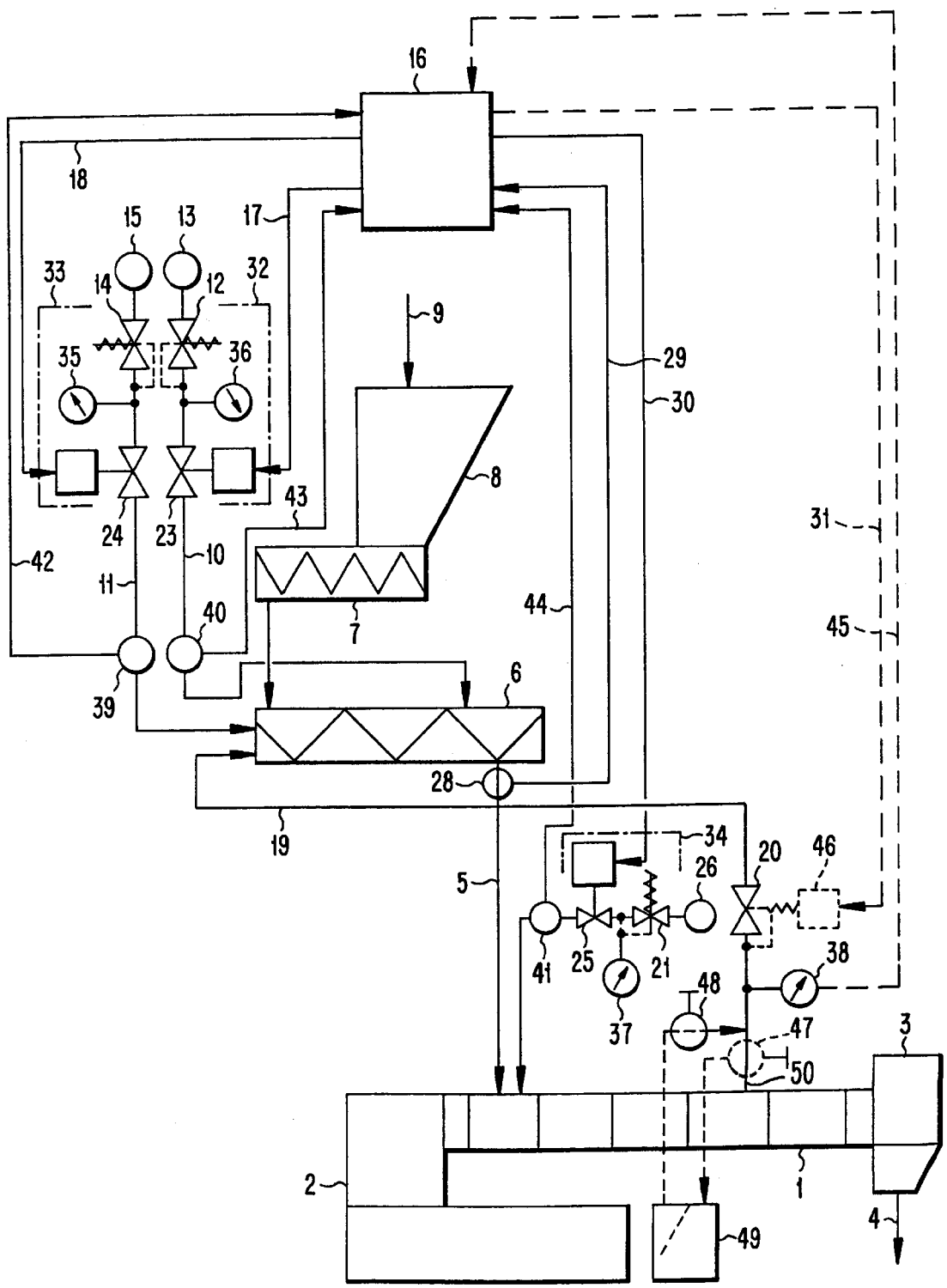

BOILER EXTRUSION PROCESS AND PLANT FOR PRODUCTS, PREFERABLY FOR HUMAN OR ANIMAL CONSUMPTION

BACKGROUND OF THE INVENTION

This invention relates to a process for the boiling extrusion of products, preferably for human or animal consumption, in which a predetermined amount of solid is pre-conditioned, before the boiling extrusion, by means of a predetermined amount of live steam and a predetermined amount of water in a conditioning means, in order to moisten and preheat the product, and in which a predetermined amount of water is fed into an extruder following the conditioning means and an adjustable steam pressure is thereby produced in the extruder in order to influence the degree of expansion of the extrudate, wherein regulation of this steam pressure is effected by a predetermined amount of steam which is let out, locally and quantitatively, at the extruder.

The installation for carrying out the process comprises an extruder for said boiling extrusion, a conditioning means (also termed a pre-conditioning means) for the moistening and preheating of the product introduced into the extruder, a product transfer line which connects the conditioning means to the extruder, a metering means for the metered supply of a crude product into the conditioning means, and a live steam supply and a water supply into the conditioning means and into the extruder in each case, as well as a steam outlet at a predetermined point on the extruder.

During the boiling extrusion of animal foodstuffs, particularly fish food and pet foods, and in the modification of cereals, the product is advantageously extruded at a relatively high water content between 20–35% and at temperatures of 100–180° Celsius. It is primarily the parameters of temperature, water content, dwell time and shear (in the extruder) which are decisive for the good conglutination of starch.

In order to prolong the "time" parameter depending on the temperature and moisture content of the product to be processed, a conditioning stage (which is also termed a pre-conditioning stage) is advantageously used before the extrusion stage. Moistening (also termed dampening) and preheating of the product which is subsequently to be extruded occurs in a conditioning stage such as this. At the same time, this conditioning operation has to be effected so that the conditioned product is not yet plasticised.

After the conditioning stage, the boiling process is effected in the extruder or is continued therein in that the temperatures can be increased still further and plasticisation occurs.

Under the optimum extrusion conditions, this plastic mass is inflated very considerably at temperatures above 100° Celsius by the steam pressure associated therewith, so that it then solidifies to form a foam-like structure similar to bread when it emerges from the die at the end of the extrusion process, during the emergence of moisture and the expansion of the product which are associated therewith, and during the cooling due to expansion which is associated therewith.

The degree of expansion is determined by the boiling process. In order to separate the mutual influencing of boiling and shaping, a steam outlet is installed at a predetermined point in the extruder, through the opening of which outlet the steam which is present in the product can escape at a predetermined pressure which corresponds to the desired product. Ultimately, the temperature of the product falls downstream of the shaping die, due to the evaporation of water, i.e. it falls towards 100° Celsius at atmospheric pressure.

The degree of expansion of the extrudate can easily be influenced by regulating the steam pressure at this steam outlet. The water which evaporates during expansion, and which can amount to up to 7% of the extruder throughput, has a very large energy content.

SUMMARY OF THE INVENTION

The object of the present invention was therefore to recover this energy. This is achieved by the process according to the invention in that steam which is let out at the aforementioned steam outlet is fed into the conditioning stage. In the installation according to the invention, a connecting line is provided from the aforementioned steam outlet to a predetermined point on the conditioning means.

The advantages of the invention are firstly that a corresponding amount of live steam can be saved in the conditioning means, and secondly that by separating steam from the product before it is shaped in the die, the product can be partially dewatered, due to which a lesser amount of air is required for drying the product.

A further advantage is that due to this transfer of steam which is let out of the extruder into the conditioning stage, the emission of odours and the precipitation of moisture, fat and dust particles in the environment or in a disposal stage are totally eliminated, i.e. all emissions of odours, moisture and dust are advantageously recycled to the conditioning stage and are thus recycled to the product again by this steam recycle. In most cases, particularly for the production of dense extrudates, it is worthwhile to provide a steam recycle wherein the proportions of solids can optionally be separated out in a solids separator downstream of the steam outlet. Depending on the recipe, up to about 80% of the live steam can be saved by a steam recycle such as this. Finally, it is extremely simple and inexpensive to put the invention into effect even on installations which already exist.

BRIEF DESCRIPTION OF THE DRAWING

The invention is explained in more detail with reference to an example, which is illustrated schematically in the FIGURE.

DETAILED DESCRIPTION OF THE REFERRED EMBODIMENTS

The FIGURE shows an extruder 1 having a drive 2 and a cutting apparatus 3 at the outlet end of the extruder 1, and having a product outlet 4. The extruder 1 receives the product to be processed from a conditioning means 6 via a product transfer line.

The conditioning means is generally an endless mixing screw into which the solid product to be conditioned is fed by a metering means 7. The solid product to be metered is fed via a product inlet 9 into a product hopper 8.

Live steam is then fed into the conditioning means 6 via a live steam supply 10 and water is also fed in via a water supply 11, in order to form, together with the solid product, a mixture of predetermined moisture content and predetermined heat content. In addition, this mixture can be heated to a predetermined temperature by additional heating means at the conditioning means 6. The temperature of this mixture is measured and indicated in the product transfer line 5 by means of a temperature sensor 28, and/or is transmitted to a control system 16, which is explained below, by means of a signal line 29.

The live steam supply into the conditioning means 6 is metered by a first control means 32, which comprises a pressure regulating valve 12 and a control valve 23 as well as a manometer 36, and which receives the live steam from a live steam feeder 13.

An analogous situation applies to the supply of water into the conditioning means 6, in that this is metered by a second control means 33, which comprises a pressure regulating valve 14 and a control valve 24 as well as a manometer 35, and which is supplied from the water feed 15.

A third control means 34 for water controls the supply of water into the extruder 1, and comprises a pressure regulating valve 21 and a control valve 25 as well as a manometer 37, and is supplied by a water feed 26.

All three control valves 23, 24 and 25 are controlled by a control system 16 in order to supply the requisite amount of steam or water at the corresponding point in each case. These control valves, for example, are commercially available motorised valves, e.g. those of the "von Rohr" brand. Control valve 23 receives the control command from the control system 16 via a control line 17, control valve 24 receives the control command from a control line 18, and control valve 25 receives the control command via a control line 30. The respective amount of live steam is measured by a flow measuring device 40 which is provided in the live steam supply 10, and the amount is transmitted via a signal line 43 to the controller 16. A similar situation exists for the amount of water fed into the conditioning means 6 and for the amount of water fed into the extruder, comprising the flow measuring device 39 and 41, respectively, and the signal line 42 and 44, respectively, which are also shown in the FIGURE.

Said pressure regulating valves 12, 14 and 21, and control valves 23, 24 and 25, are known in the art and have been used with the extruder which is also known and which is sold world-wide by the applicant under the brand name "BI-Ex" in this connection. Depending on the product to be processed, a predetermined rotational speed of the extruder, a predetermined motor output of the drive 2, and a predetermined amount of water or live steam are provided. If the power consumption changes for each recipe, the amount of water or the amount of steam is altered until the motor output at a predetermined rotational speed again falls within the predetermined range.

According to the invention, a connecting pipe 19 is provided in addition and is installed with one end at a predetermined point, generally in the end region towards the outlet end of the extruder (see FIGURE), with a steam outlet 50, and with its other end at the inlet end of the conditioning means 6, in order to effect the aforementioned recycling of steam from the extruder 1 into the conditioning means 6.

What is termed a pressure maintaining valve 20, which maintains a set pressure in the extruder, is advantageously provided in the connecting pipe 19.

The pressure at this valve 20 can either be set manually or can be set by the control system 16 via a control line 31 and a servomotor 46, depending, for example, on a processing recipe controlled by the control system 16, by means of which recipe other machine parameters, which are not explained further here, such as the rotational speed and output of the drive, etc., are controlled or regulated.

In operation, and based on empirical values depending on the recipe, the amount of water and live steam (comprising a predetermined amount of heat) are set for the conditioning means 6, and the amount of water is set for the extruder 1, together with said other machine parameters which are not explained here, and the product resulting therefrom is checked at the product outlet 4 with regard to its appearance and apparent density.

In the course of this procedure, the temperature of the mixture coming from the conditioning means 6 can be monitored by the operator on a display of the temperature sensor 28 or can be controlled by the control system 16, in that the amount of live steam fed into the conditioning means 6 is correspondingly adjusted until the temperature of the mixture reaches a scheduled value.

For example, if the product is too light and/or if it has an apparent density which is too low (i.e. if a predetermined size of bag filled with the product has an insufficient weight), the pressure at the valve 20 is reduced, so that a smaller pressure difference is produced between the product and the atmosphere downstream of the die in the cutting apparatus 3, and a reduced expansion and thus a higher apparent density of the product are obtained.

The larger amount of steam which thereby flows into the conditioning means 6 is compensated for by a correspondingly smaller amount of live steam from line 10, which is adjusted by means of the control system 16 or manually, based on the predetermined product temperature at the sensor 28. This means that the control system 16 or the operator throttles the amount of live steam via the control valve 23 at a constant set pressure at the pressure regulating valve 12 until the temperature at the sensor reaches the predetermined scheduled value.

The machine parameters which have not been mentioned, as well as the amount of water for the conditioning means and the amount of water for the extruder, remain set at constant values.

If the pressure at the pressure maintaining valve 20 is set by the control system 16 by means of the servomotor 46, this is effected by means of a comparison of the scheduled value which is input into the control system with an actual value which is given by the manometer 38 and is input into the control system 16 via line 45.

In addition, the steam which is let out from the steam outlet 50 can be passed through a solids separator 49 before being conveyed into the connecting line 19. For this purpose, a change-over damper 47 is provided in the steam outlet 50, and conducts the let-out steam together with any entrained solids into the separator 49. Recycle of the "purified" steam from the separator 49 into the connecting pipe 19 is effected by an opened sealing flap 48, which is closed when the separator 49 is not being used. Moreover, the recycle of what is termed the "purified" steam into the connecting pipe takes place upstream of the aforementioned manometer 38 which is connected to the connecting pipe, and which in turn is connected upstream of the aforementioned pressure maintaining valve 20 in the connecting pipe 19.

| Legend | |
|---|---|
| 1 | Extruder |
| 2 | Drive |
| 3 | Cutting apparatus |
| 4 | Product outlet |
| 5 | Product transfer line |
| 6 | Conditioning means (also termed pre-conditioning means) |
| 7 | Metering means |
| 8 | Product hopper |

-continued

Legend

| | |
|---|---|
| 9 | Product inlet |
| 10 | Live steam supply |
| 11 | Water supply |
| 12 | Pressure regulating valve for live steam |
| 13 | Live steam feed |
| 14 | Pressure regulating valve for water |
| 15 | Water feed |
| 16 | Control system |
| 17 | Control line for steam |
| 18 | Control line for water |
| 19 | Connecting pipe |
| 20 | Pressure maintaining valve |
| 21 | Pressure regulating valve for water |
| 22 | Control valve |
| 23 | Control valve |
| 24 | Control valve |
| 25 | Control valve |
| 26 | Water feed |
| 27 | Control line |
| 28 | Product temperature sensor |
| 29 | Signal line |
| 30 | Control line for water |
| 31 | Control line for pressure maintaining valve |
| 32 | First control means for the amount of live steam |
| 33 | Second control means for the amount of water |
| 34 | Third control means for the amount of water |
| 35, 36, 37, 38 | Manometer |
| 39, 40, 41 | Flow measuring device |
| 42, 43, 44, 45 | Signal line |
| 46 | Servomotor |
| 47 | Change-over damper |
| 48 | Sealing flap |
| 49 | Solids separator |
| 50 | Steam outlet |

What is claimed is:

1. A process for pre-conditioning a product for boiling extrusion of the product, comprising the steps of:

preconditioning a predetermined amount of the product during a conditioning stage which occurs before a boiling extrusion, by means of a predetermined amount of live steam and a predetermined amount of water in a conditioning means, in order to moisten and preheat the product;

feeding a predetermined amount of water fed into an extruder following the conditioning stage to produce an adjustable steam pressure in the extruder in order to influence the degree of a expansion of extrudate; and regulating the stream pressure by an amount of steam which is let out of the extruder and which is locally and quantitatively predetermined, the steam which is let out being fed into the conditioning stage.

2. The process according to claim 1, wherein the pressure of the steam is adjusted to a predetermined value.

3. The process according to claim 2, wherein said pressure is controlled.

4. The process according to claim 1, wherein the amount of live steam fed into the conditioning stage is metered depending on the amount of steam coming from the extruder.

5. The process according to claim 1, wherein the temperature of the product discharged from the conditioning stage is measured and the measured temperature is taken as a standard value for said amount of live steam.

6. The process according to claim 1, wherein contents of solids which are present in the steam are separated therefrom before the stream enters the conditioning stage.

7. An installation for the boiling extrusion of a product, comprising:

an extruder for boiling extrusion;

a conditioning means for moistening and preheating of product introduced into the extruder;

a product transfer line connecting the conditioning means to the extruder;

a metering means for metered feeding of a raw product into the conditioning means;

a means for supplying steam into the conditioning means;

a means for supplying water into the conditioning means;

a means for supplying water into the extruder;

a steam outlet at a predetermined point on the extruder; and a connecting line provided from the steam outlet to a predetermined point on the conditioning means.

8. The installation according to claim 7, comprising:

an adjustable pressure maintaining valve provided in said connecting line; and a product temperature sensor provided in said product transfer line.

9. The installation according to claim 8, comprising:

a first quantitative control means for the live steam fed into the conditioning means;

a second quantitative control means for the water fed into the conditioning means;

a third quantitative control means for the water fed into the extruder; and a control system which regulates the amount of live steam based on an output of said product temperature sensor.

10. The installation according to claim 9, wherein the control system includes means for controlling the amount of water for the conditioning means and the amount of water for the extruder.

11. The installation according to claim 7, comprising:

a solids separator between the steam outlet and the connecting line.

12. The process according to claim 1, wherein said products are for at least one of human and animal consumption.

* * * * *